Figure 1:
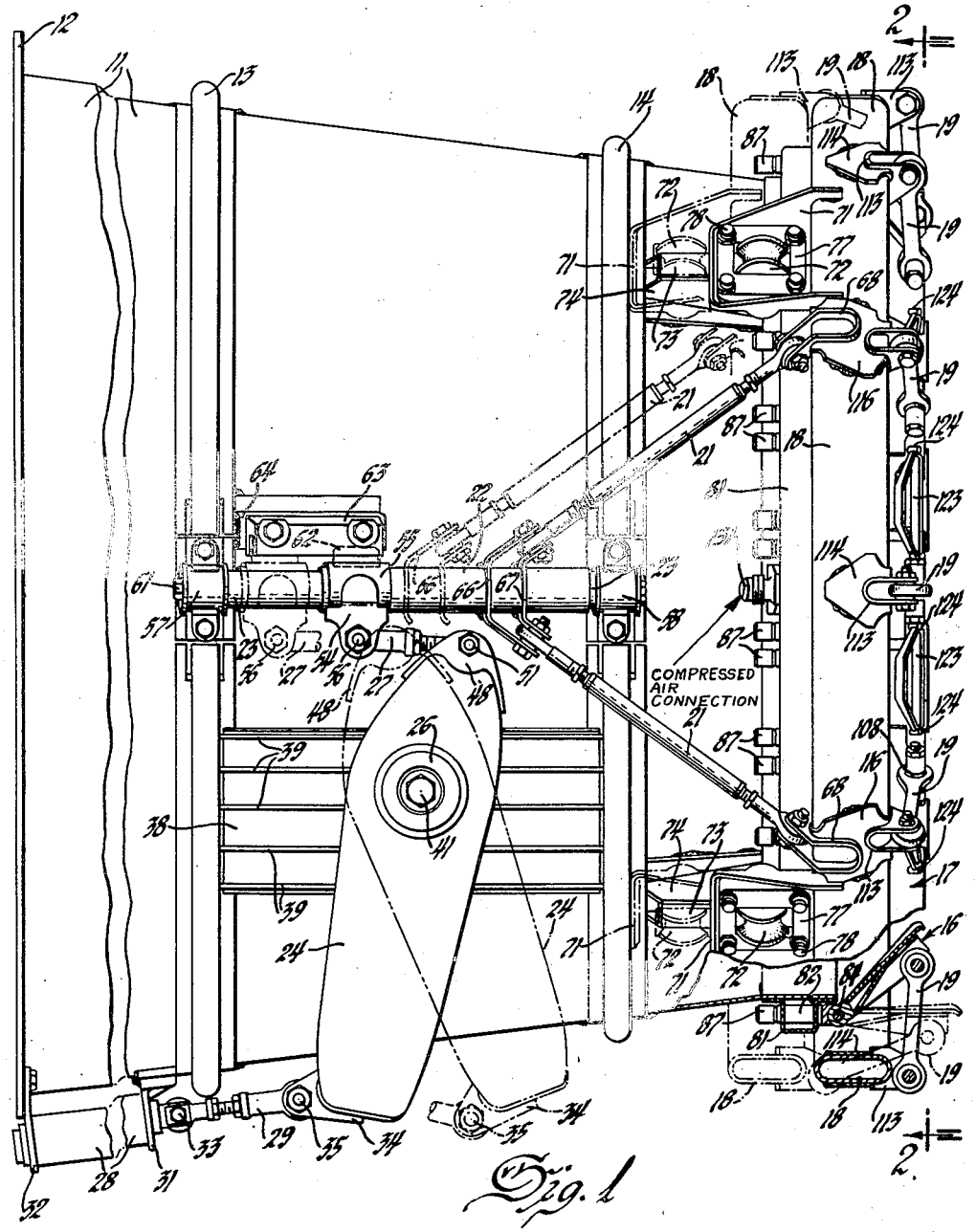

April 1, 1958 A. W. GARDINER 2,828,602
MULTIFLAP VARIABLE NOZZLE
Filed Jan. 12, 1951 5 Sheets-Sheet 2

Inventor
Arthur W. Gardiner
By Willits, Helwig & Baillio
Attorneys

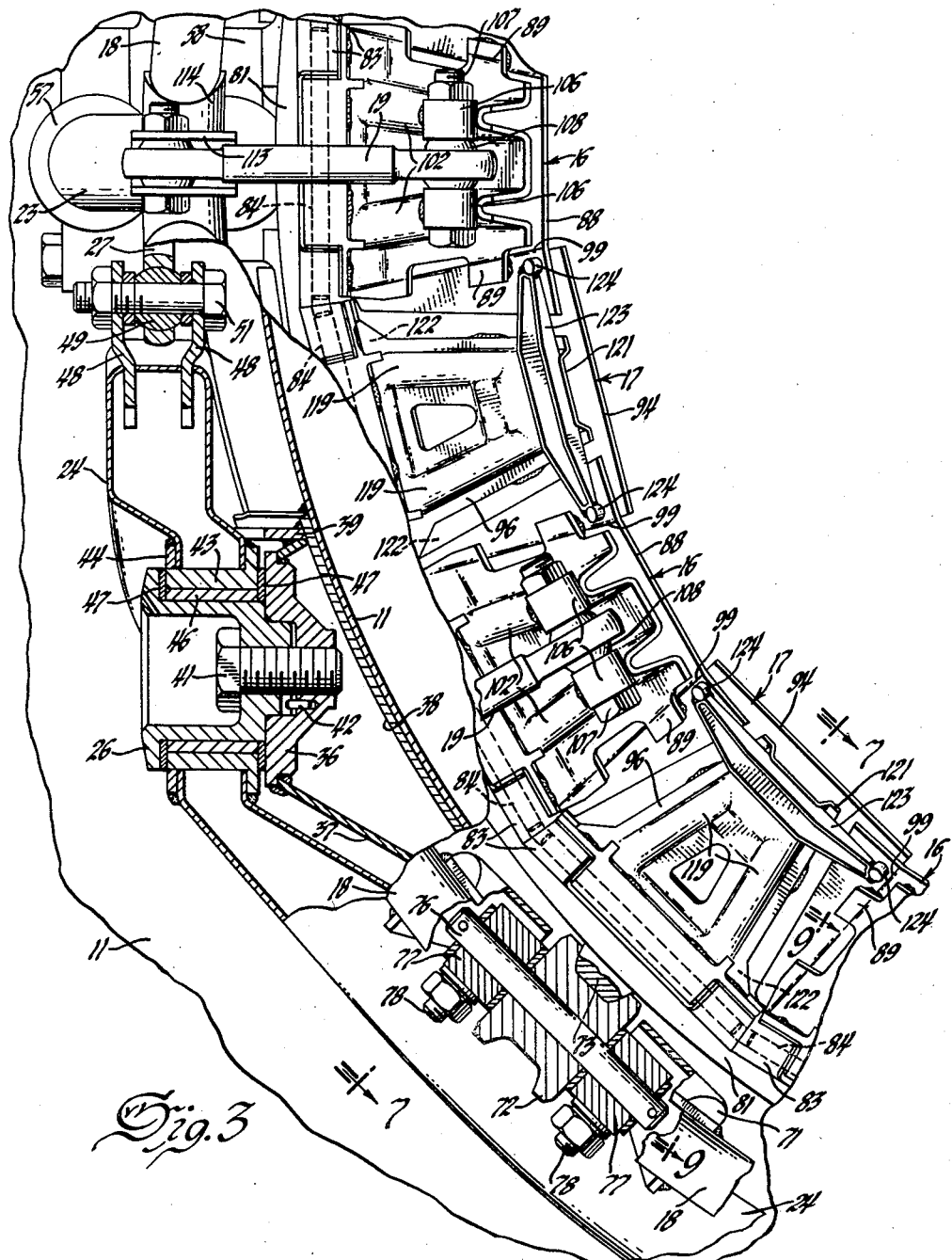

April 1, 1958     A. W. GARDINER     2,828,602
MULTIFLAP VARIABLE NOZZLE
Filed Jan. 12, 1951     5 Sheets-Sheet 4
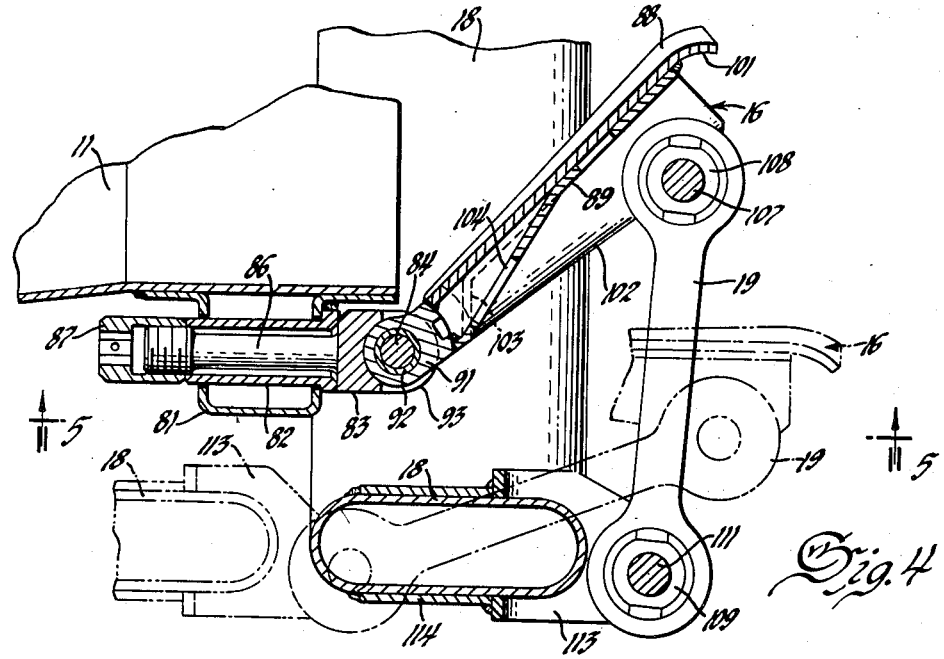
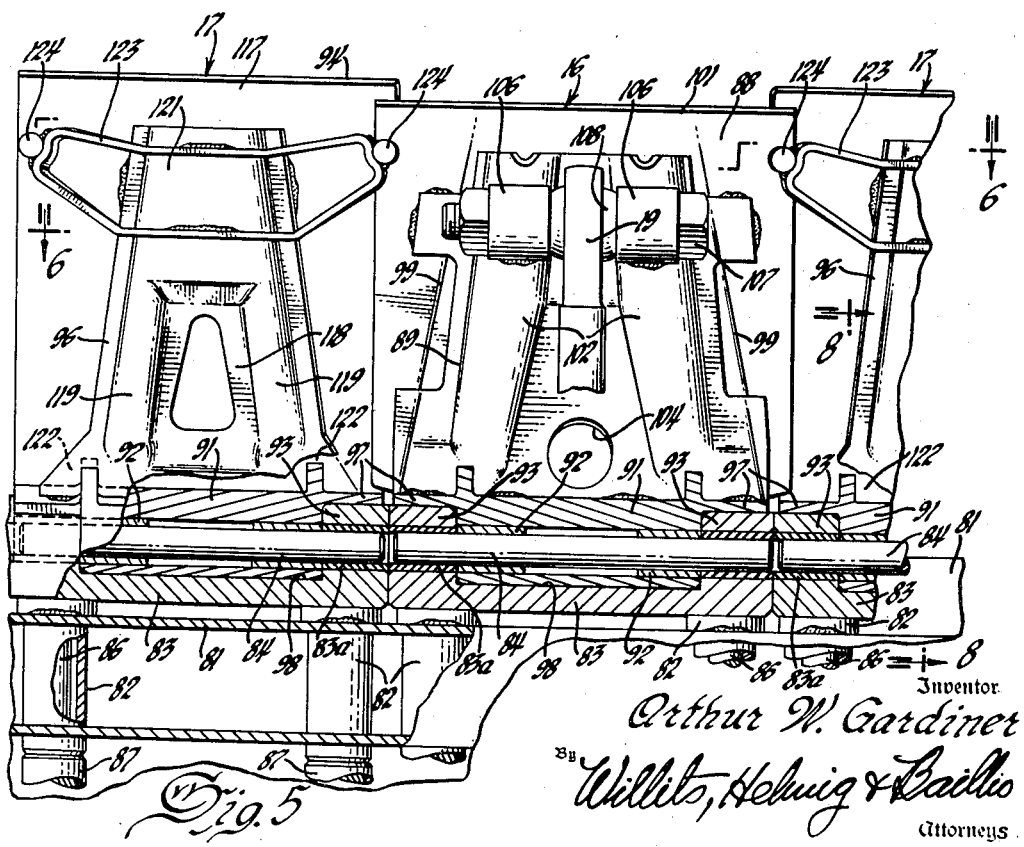
Inventor
Arthur W. Gardiner
By Willits, Helwig & Baillio
Attorneys April 1, 1958   A. W. GARDINER   2,828,602
MULTIFLAP VARIABLE NOZZLE
Filed Jan. 12, 1951   5 Sheets-Sheet 5
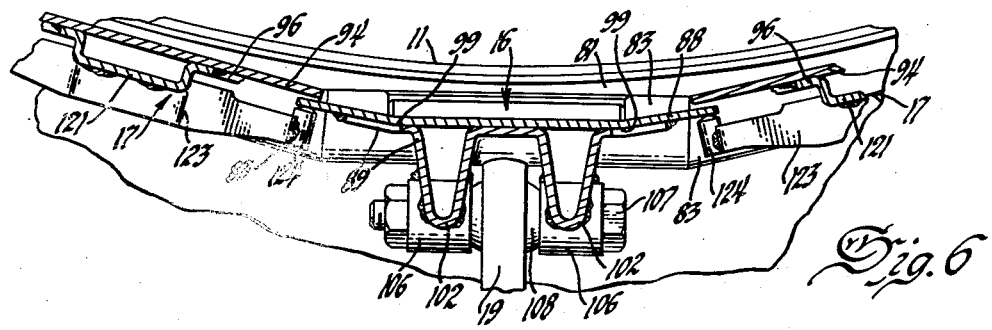
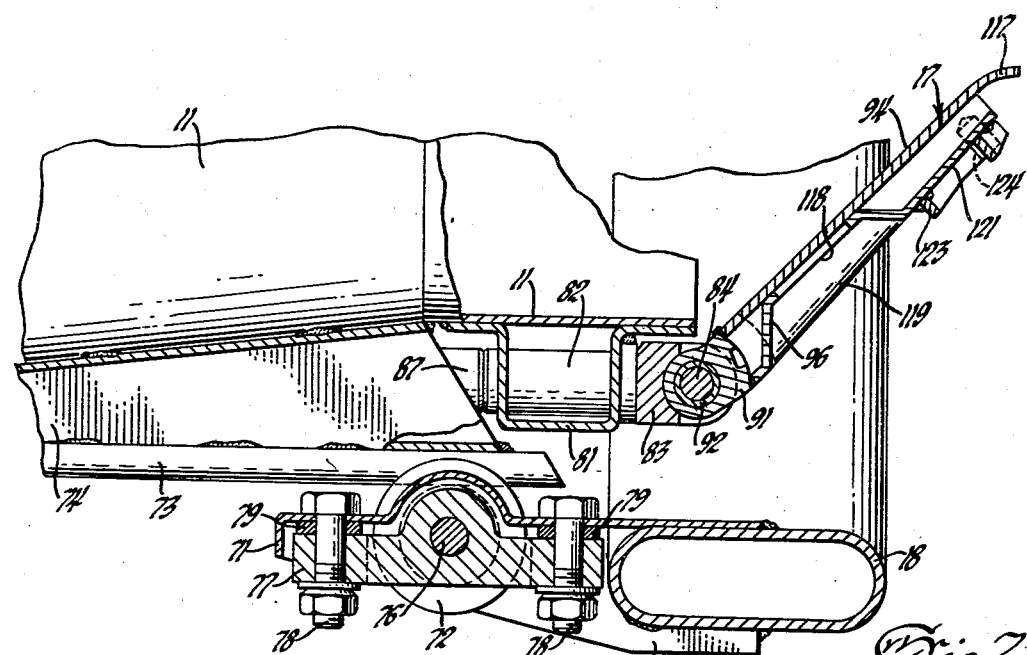
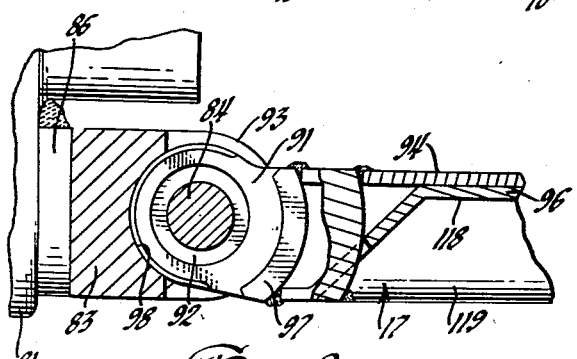
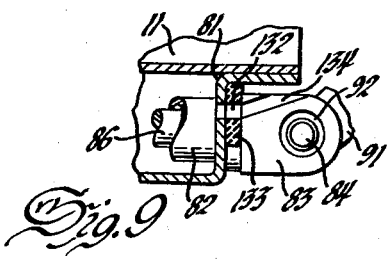
Inventor
Arthur W. Gardiner
By Willits, Helmig & Baillio
Attorneys

United States Patent Office 2,828,602
Patented Apr. 1, 1958

2,828,602

MULTIFLAP VARIABLE NOZZLE

Arthur W. Gardiner, Indianapolis, Ind., assignor to General Motors Corporation, Detroit, Mich., a corporation of Delaware Application January 12, 1951, Serial No. 205,773

11 Claims. (Cl. 60—35.6)

This invention relates to variable propulsion nozzles for use with jet propulsion engines.

It has been generally recognized that the operating characteristics of jet propulsion engines, such as gas turbine jet engines, may be improved by the provision of means for varying the area of the jet nozzle, and many structural arrangements for this purpose have been proposed.

Notwithstanding the benefits to be gained from a variable nozzle, structures for this purpose hitherto proposed, which have been numerous and of various types, have not been generally adopted, because of various faults and deficiencies of the prior variable nozzles.

Certain turbojet installations have incorporated an afterburner, in which fuel is burned in the exhaust conduit of the engine, thus heating and expanding the combustion gases after their passage through the turbine. Where an afterburner is installed, it has been deemed necessary to provide an exhaust nozzle of the two-position type by virtue of which the area of the gas jet orifice may be set at either of two values. The jet opening is restricted under normal operating conditions, and is enlarged when the afterburner is in operation. Nozzles of this type do not provide for intermediate values of area of the jet nozzle.

The provision of a variable jet nozzle which is acceptable for aircraft use presents a difficult problem which, as stated above, has not hitherto been satisfactorily solved. The jet pipes are of considerable size, ordinarily about two feet in diameter. The temperature of the gases is usually of the order of 1200 degrees F., and the pressure and velocity of the gas are high. Obviously, a satisfactory aircraft structure must be light in weight and highly reliable.

My invention is directed to a jet propulsion nozzle for aircraft use which is continuously variable over a considerable range, which is light in weight and strong and reliable structurally, and which is not affected adversely by high temperatures and pressures of the gases or by differential thermal expansion. The variable nozzle of the invention is applicable to engines with and without afterburners and, by virtue of numerous ingenious, novel, and highly advantageous features, provides a fully satisfactory solution to the problem of providing a variable jet nozzle for aircraft jet propulsion.

The principal object of the invention is to provide an improved variable jet propulsion nozzle. Other objects are to provide a nozzle of simple and rugged construction, a nozzle which is sealed throughout its range of areas, and a construction particularly adapted to withstand high temperatures. A further object is to provide an improved operating mechanism for a variable nozzle. Other objects and advantages of the invention will be apparent to those skilled in the art from the detailed description herein of the preferred embodiment of the invention.

Figure 2:
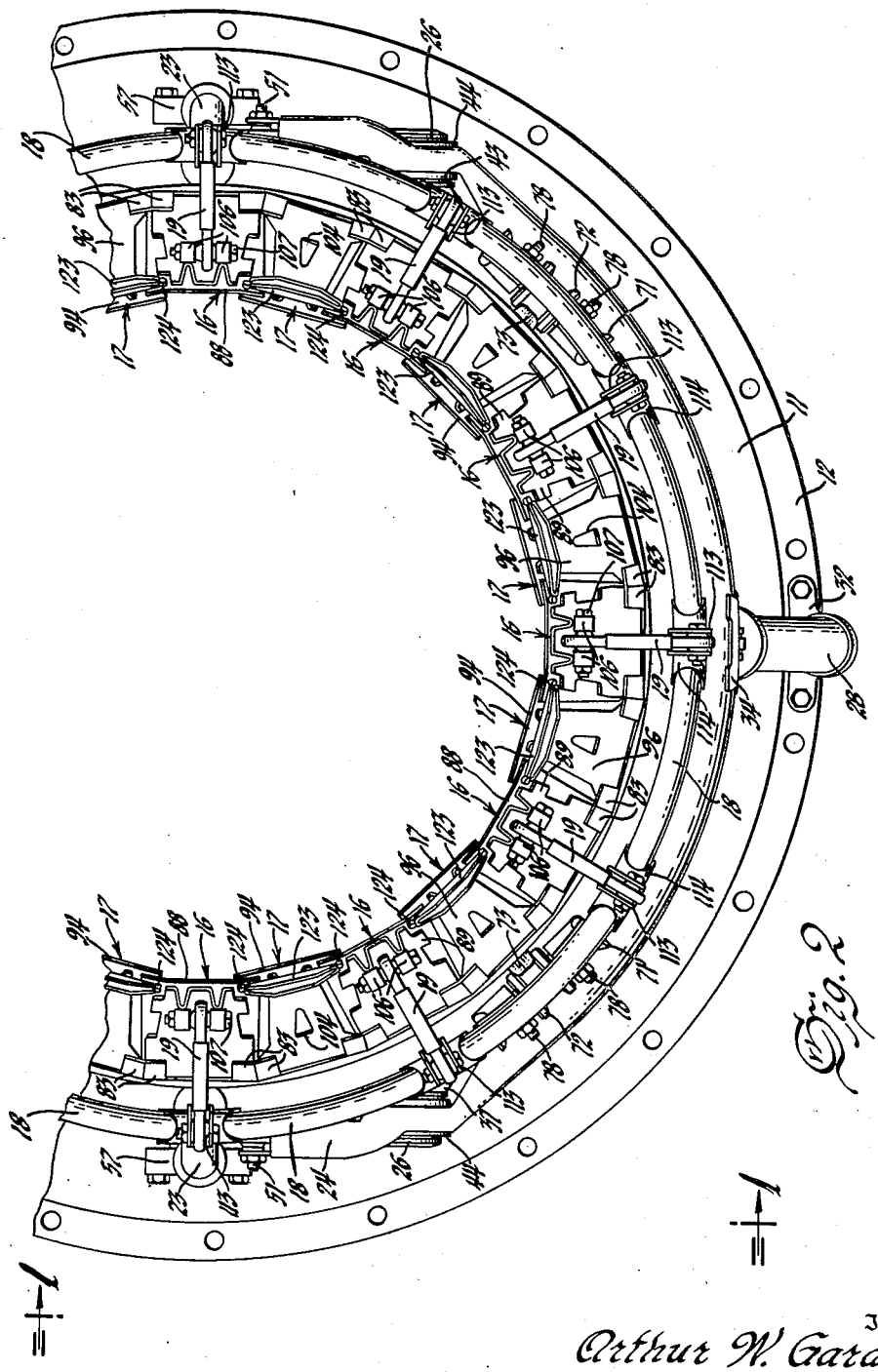

Referring to the drawings: Figure 1 is a longitudinal elevation of a gas turbine engine tail pipe including the preferred embodiment of the variable nozzle mechanism of the invention; Figure 2 is a partial elevation view of the exhaust end; Figure 3 is a view of a portion of Figure 2, with parts cut away; Figure 4 is an enlarged view of a portion of Figure 1; Figure 5 is a view taken on the plane indicated in Figure 4, with certain parts cut away; Figure 6 is a sectional view taken on the plane indicated in Figure 5; Figure 7 is a sectional view taken on a plane containing the axis and passing through one of the actuating ring guide members; Figure 8 is a partial sectional view taken on the plane indicated in Figure 5; and Figure 9 is a detail sectional view taken on the plane indicated in Figure 3.

The apparatus of the invention is illustrated in Figure 1 in combination with the tail pipe 11 of a jet propulsion engine, which tail pipe, as is well known, discharges the exhaust from the jet engine to atmosphere to provide the propulsive jet. The engine as such is not illustrated, since the invention may be applied to engines of various types, the structure of such engines is well known, and the invention may be understood without reference to the structure of the engine which generates the gas stream. The tail pipe 11 is ordinarily circular in section, may taper as shown, and may be provided with a bolting flange 12 by which the assembly of the invention is coupled to the engine. Stiffening rings 13 and 14 are preferably welded to the tail pipe.

By way of introduction to the detailed description of the structure shown, it may be pointed out that the area of the outlet from the tail pipe 11 is varied by the movement of a number of plates or flaps, preferably twenty-four, disposed in a ring at the outlet of the tail pipe. The flaps are forced inwardly to constrict the jet opening. Alternate flaps 16 are master flaps which are coupled to a mechanical operating mechanism; the intermediate or follower flaps 17 are actuated by the immediately adjacent master flaps. All the flaps are actuated concurrently by a ring 18 encircling the tail pipe and guided for reciprocation axially thereof. The ring 18 is coupled to the master flaps by links 19. Four tie rods 21 are coupled to the ring. Each pair of tie rods 21 is connected to a coupling member 22 which reciprocates on a guide 23 mounted on the tail pipe. An approximately semicircular yoke 24 rotatable about two pivots 26 extending from the tail pipe structure is connected to the coupling members by links 27. The yoke 24 is rotated by a hydraulic cylinder 28 mounted on the tail pipe and connected to the yoke by a link 29.

Certain advantages of the invention will be apparent from the foregoing outline of the structure, but many other important advantages will become clearer in the course of the detailed description.

The cylinder 28 may be any suitable commercial hydraulic cylinder, or could be a pneumatic cylinder or other actuating means, although hydraulic operation is preferred. The cylinder may be mounted on the tail pipe in any suitable manner, as by a bracket 31 welded to the tail pipe and a bracket 32 bolted to flange 12. The piston rod of the cylinder may have a clevis end which is coupled by a pin 33 to the link 29, which may be a conventional link with eye fittings at each end and with provision for adjustment of the length of the link. The link 29 is coupled to a bracket 34 welded to the yoke 24 by a pin or bolt 35.

The yoke 24 (Figs. 1, 2, and 3) is generally semicircular in form and is of light tubular construction, as will be most clearly apparent from Figure 3. The yoke 24 may be formed from sheet metal by conventional methods. The yoke rotates about an axis defined by two pivot members 26, the structure of which is shown most clearly in Figure 3. Each pivot is a flanged cup-shaped member which is piloted in a disk 36 welded to a generally conical sheet metal boss 37 fixed to the tail pipe 11. The support 37 is welded to a plate 38 (Figs. 1 and 3) extending between the stiffening rings 13 and 14 and provided with ribs 39. This plate 38, which is welded to the tail pipe, provides additional strength and distributes the load due to the reaction of the yoke 24 on the pivot 26. The pivot 26 is piloted in the disk 36, is secured therein by a cap screw 41, and is held against rotation by a key 42. The yoke 24 is mounted for rotation on the pivot 26 by a bearing assembly comprising a flanged sleeve 43 welded to the yoke, a ring 44 welded to the outer face of the yoke, a bushing 46 fitted in the sleeve 43 and thrust washers 47. In assembling the apparatus, the yoke is put in position and the pivot members 26 are then mounted.

Ears 48 of relatively heavy gauge metal are fixed to the upper ends of the yoke 24 to provide clevis fittings. The link 27 which connects the yoke to the coupling member 22 is provided with a ball joint end connection arrangement 49, which may be of standard commercial type, and is mounted between the ears 48 by a bolt 51. The forward end of the link 27 is coupled by a bolt 56 to a bifurcated bracket 54 extending from a sleeve 55 mounted on and fixed to the tubular coupling member 22, the structure being similar to that at the rear end of the link, illustrated in Figure 3. The member 22 slides on a tubular guide 23 (Fig. 1) extending between brackets 57 and 58 bolted to the tail pipe 11 over the ribs 13 and 14. The brackets 57 and 58 may be counterbored to receive the tube 23, which is slid into place in the brackets and may be retained by cap screws 61 at each end, the cap screws being threaded into plugs fixed in the ends of the tube. A blade 62 extending upwardly from the sleeve 55 slides in a groove in a guide 63 bolted to a U-shaped bracket 64 welded to the tail pipe 11. The blade 62 serves to prevent rotation of the coupling member 22 about its axis. The coupling member 22 has welded thereon plates 66 and 67 which couple the forward end of the links 21 to the member 22. This connection likewise is a conventional ball joint arrangement, similar to the joint 49, providing angular freedom of movement for the links 21.

The links 21 diverge outwardly from each other at about a sixty degree angle and are coupled by a ball joint and pin arrangement to brackets 68 welded to the ring 18. The links 21 includes conventional means for adjustment of the lengths thereof so that the ring 18 may be accurately adjusted to conform to a plane perpendicular to the axis of the tail pipe.

The mechanism by which the ring 18 is reciprocated axially of the tailpipe is claimed in the copending application of Arthur W. Gardiner and George M. Ferry, Serial No. 206,624, filed January 18, 1951, for Variable Nozzle Actuating Mechanism.

The structure of the ring 18 and the arrangement by which it is centered with respect to the axis of the tail pipe are shown most clearly in Figures 1 and 7. Projecting forward from the ring and welded thereto are four brackets 71 of channel section spaced 90 degrees apart around the ring. A flanged roller 72 mounted on each bracket 71 traverses a rail 73 fixed to ribs 74 welded onto the tail pipe 11. The shaft 76 of the roller 72 is mounted in a rectangular frame 77 fixed to the bracket 71 by four bolts 78. The bolts 78 may pass through elongated openings in the frame 77 or the bracket 71 to provide for adjustment of the roller 72 circumferentially of the tail pipe. The radial distance of the roller 72 from the center of the tail pipe may be adjusted by shims 79. By this arrangement, manufacturing variations can be accommodated and the ring 18 can be accurately centered. Since the rollers 72 are ahead of the plane of the ring 18, thermal expansion of the tail pipe is accommodated by torsion of the ring, without causing binding.

The mechanism by which the ring 18 is properly aligned and is reciprocated will be clear from the foregoing. Before proceeding with the description of the connection of the ring 18 to the flaps 16, the structural arrangement and mounting of the flaps will be described.

There are preferably twelve master flaps 16, each coupled to the ring 18 by a connecting rod 19 for simultaneous operation and twelve follower flaps 17 alternating with the master flaps and actuated by the adjacent master flaps. The supporting and pivot arrangement for the flaps is best shown in Figures 4, 5, 7, and 8. The flaps are mounted on a flanged channel ring 81 welded at the exhaust end of the tail pipe 11. Forty-eight sleeves 82 are passed through holes in the front and rear faces of the ring 81 and are welded in place. Each flap is supported by a hinge block 83, bushings 83a in which receive the ends of a pin 84 on which the flap is rotatably mounted (Fig. 5). Each block 83 is integral with two studs 86 which extend through the sleeves 82 and are retained by nuts 87 which pull the blocks 83 against the ends of the sleeves 82.

Each master flap 16 comprises two sheet metal plates 88 and 89 which are welded at the forward edges thereof to a pivot block 91. The pivot block comprises a portion which fits closely between the arms of the support 83 and is drilled and fitted with bushings 92 for the hinge pin 84. The marginal portions 97 of the block 91 are formed to fit closely against the arcuate rear surface 93 of the arms of the mounting block 83.

The follower flaps 17, although different in form from the master flaps, are similarly mounted. Each follower flap comprises a main plate 94 and a reinforcing plate 96 welded to a pivot block 91 fitted with bushings 92 for the hinge pin 84. The arcuate extension 97 of the pivot member which mates with the surface 93 of the support block is most clearly shown in Figure 8. The forward surface of the members 91 is cylindrical and fits closely within a cylindrical groove 98 in the block 83. This close fit between the relatively rotatable members 83 and 91 minimizes escape of gas at the hinge point, and thus increases propulsive efficiency and reduces the heating of the hinges by the hot gas. When the support blocks 83 are in place, the ends of these blocks also fit closely together as indicated in Figures 3 and 5.

It will be noted that the construction just described permits individual assembly or replacement of the flaps, since, by moving the nuts 87, the support member 83 and the flap mounted thereon can be removed, and, by sliding out the hinge pin 84, the flap may be disassembled from the support.

Considering now the structure of the master flaps, with particular reference to Figures 3 to 6, the main plate 88 of each flap is generally flat, but is bent inward slightly at the edges along the bending lines 99 indicated in Figure 5 to achieve more nearly a surface contact with the flaps 17. This formation of the edge of the plate is most clearly shown in Figure 3. The rear end of the plate is curved outwardly as indicated at 101 in Figure 4 to avoid the action of a sharp orifice edge on the gases when the nozzle plates are closed as indicated in Figure 4. The deformation of the plate 88 also increases its rigidity. The plate 88 is greatly strengthened by the plate 89 welded to the plate 88 and the bearing member 91. As will be most clearly apparent from Figures 4 and 5, the plate 89 covers approximately the area of the plate 88 between the fold lines 99. The plate 89 is deformed to provide two ridges 102 running generally in a fore-and-aft direction. The rearward part of the plate 89 between the channels 102 is in contact with the plate 88, and the marginal portion of plate 89 is in contact with plate 88 except immediately adjacent the block 91, where it is bent upwardly as indicated at 103 in Figure 4, providing a cooling air inlet between the portion 103 and the bearing member 91 at each side. Between the ribs 102, the rear part of the two plates are in contact, but approximately the forward half of the plate 89 is bent away from the plate 88. An opening 104 in this portion of the plate 88 also admits cooling air to the space between the plates, the air being drawn out through the rear ends of the passages formed by the ribs 102 by the inducing action of the gas jet.

Plugs 106 seated in notches in the ribs 102 and welded thereto are bored for a bolt 107 on which a ball 108 is mounted between the plugs 106. The ball 108, which may be a commercial article, is received in a spherical socket in the end of the connecting rod 19. The other end of the rod 19 likewise is formed to receive a ball 109 mounted by means of a bolt 111 in a U-bracket 113 welded to the ring 18. The ring 18 is reinforced by plates 114 (Fig. 1) at the points of mounting of certain of the brackets 113 and by stiffener plates 116 common to the mounting points of the brackets 68 and 113.

The follower flaps 17 (Figs. 5 to 8) comprise a plate 94 which is flat except that it is curved outwardly at the rear margin as indicated at 117. The stiffener plate 96 which is welded to the plate 94 is formed for flow of cooling air between the plates. The central portion 118 of the plate 96 is in contact with the plate 93, as well as the marginal portion except closely adjacent the mounting block 91. The plate 96 is deformed to provide two channels or ribs 119 which communicate with the rearward portion 121 of the plate 96, which is spaced from the plate 94. Air enters between the two plates through entrances 122 where the plates are separated adjacent the block 91 and flows rearwardly through the channels defined by the portions 119 and 121 of the plate 96.

A bracket 123 formed of metal strip is welded to the portion 121 of the plate 96 and plugs 124 formed of short sections of rod are welded to the ends of the brackets 123. The plugs 124 are formed with convex inner faces which engage the outer surface of the master flaps. As will be apparent from Figures 5 and 6, the master flap is engaged between the plug 124 and the plate 94 of each adjoining follower flap. When the nozzle is closed, as illustrated in Figure 3, the marginal portion of the plate 88 enters farther between the bracket 123 and the plate 94. The follower plates are thus always positively connected to the master plates for actuation thereby. It will be noted that over the full operating range of flap motion, the outer edges of each follower plate engages the inner face of the flat folded-over marginal portions of the adjacent master plate from near the pivot block 91 to near the rear margin of the plates, thus providing inter-plate seals.

To disassemble the flaps 16 and 17, the strut rods 21 are disconnected, permitting forward movement of ring 81 beyond its normal operating range. This moves all the flaps beyond the full open position and disconnects each flap from the adjacent flaps. Each individual flap may be removed by taking off the nut 87 which hold its mounting bracket in place. Assembly is accomplished by the reverse of this operation.

Provision is made for cooling the hinge blocks 83 and the flaps 16 and 17 by forced circulation of air. Compressed air for any convenient source is supplied to the interior of the flange ring 81 through a pipe or hose (not shown) coupled to one or more inlet connections 131 (Fig. 1).

Holes 132 (Fig. 9) are drilled through the rear face of the ring 81 and the weld metal 133 which fixes the sleeves 82 on the ring 81. These holes ar located at the points at which the ends of adjacent hinge blocks 83 abut each other. The outer faces of the hinge blocks are formed with semicircular channels 134 which form a conduit for air discharged through the holes 132. This air cools the hinge blocks and is discharged onto the inner surface of the flaps to aid in cooling the flaps.

A significant feature of the invention lies in the actuating mechanism for the master flaps. As will be most clearly apparent in Figure 4, the arrangement is such that the mechanical advantage of the motion transmitting mechanism coupling the ring 18 to the flap 16 is least when the flaps are in the open position and increases as the flaps move toward the closed position, the overall effect approximating that of a toggle mechanism. This is of value because the force exerted by the gas stream on the flaps increases as they are moved toward the closed position. Thus, the flaps may be moved through their entire range by a power cylinder which exerts only relatively moderate thrust and the maximum loading of the mechanism which transmits the thrust from the cylinder to the ring 18 is also moderate.

Although the operation of the mechanism will do doubt be clear from the foregoing, it may be reviewed briefly. Assuming that the flaps are in the open position, the piston of the cylinder 28 will be at its rearward limit of travel. Fluid under pressure may be admitted to the rear end of the cylinder by any standard reversing valve (not shown) which vents the forward end of the cylinder. The piston is thus moved forward. The yoke 24 is rotated clockwise, as viewed in Figure 1, and the coupling member 22 is forced rearwardly. This motion is transmitted by the rods 21 to the ring 18 which forces the valve plates 16 inwardly by means of the links 19. The plates 17 are forced inwardly by the plates 16. To open the nozzle, the action is reversed. Preferably, a double-acting cylinder and an appropriate control valve are employed so that the jet nozzle may be opened by power, particularly in view of the fact that the links 19 are substantially radial when the nozzle is closed. It will be possible by varying proportions of the mechanism to rely on the pressure of the gas passing through the nozzle to open the flaps, but in this case a less favorable motion transmitting arrangement would be required. An actuator mechanism of a servo type which will maintain the flaps in any position set by a primary control device is preferably provided.

The advantages of the invention will be apparent to those skilled in the art from the detailed description of the preferred embodiment. Among these may be noted the simplicity and lightness of the structure, the arrangement of the mechanism such that a relatively low-powered actuating cylinder is required, the provision for cooling the valve plates, the ease of assembly and disassembly of the structure, the ease of adjustment to provide for uniform actuation of the valve plates, and the adaptability of the mechanism to an installation in which high temperatures cause very considerable expansions.

The detailed description of the preferred embodiment is not to be considered as limiting or restricting the scope of the invention, as many modifications thereof may be made by those skilled in the art within the scope of the invention.

I claim:

1. A variable area nozzle for hot gas streams comprising, in combination, a hot gas duct, a number of individually removable hinge brackets mounted on the said duct adjacent the outlet thereof, a number of overlapping flaps mounted one on each of the brackets for rotation about axes generally tangent to the circumference of the duct, means for interlocking adjacent flaps for concurrent movement, and means for rotating at least some of the flaps about their axes comprising a ring encircling the duct and movable axially thereof and means coupling the ring to the said some of the flaps.

2. A variable area nozzle for hot gas streams comprising, in combination, a hot gas duct, a number of hinge brackets mounted on the said duct adjacent the outlet thereof, a number of overlapping flaps mounted on the brackets for rotation about axes generally tangent to the circumference of the duct, and means for rotating at least some of the flaps about their axes, each flap comprising two spaced plates defining a passage therebetween for cooling air, the outlet of the passage being at the free end of the flap so that air flow is induced by the gas stream flowing through the nozzle.

3. A variable area nozzle for hot gas streams comprising, in combination, a hot gas duct, a tubular mounting flange on the duct adjacent the outlet thereof, a number of hinge brackets mounted on the said flange, a number of overlapping flaps mounted on the brackets for rotation about axes generally tangent to the circumference of the duct, means for rotating the flaps about their axes, means for admitting air to the said flange, and means for discharging air from the flange to cool the hinge brackets.

4. A variable area nozzle for hot gas streams comprising, in combination, a hot gas duct, a tubular mounting flange on the duct adjacent the outlet thereof, a number of hinge brackets mounted on the said flange, a number of overlapping flaps mounted on the brackets for rotation about axes generally tangent to the circumference of the duct, means for rotating the flaps about their axes, means for admitting air to the said flange, and means for discharging air from the flange to cool the hinge brackets, each flap comprising two spaced plates defining a passage therebetween for cooling air, the outlet of the passage being at the free end of the flap so that air flow is induced by the gas stream flowing through the nozzle.

5. A variable area nozzle for hot gas streams comprising, in combination, a hot gas duct, a tubular mounting flange on the duct adjacent the outlet thereof, a number of hinge brackets mounted on the said flange, a number of overlapping flaps mounted on the brackets for rotation about axes generally tangent to the circumference of the duct, means for interlocking adjacent flaps for concurrent movement, means for rotating at least some of the flaps about their axes comprising a ring encircling the duct and movable axially thereof and means coupling the ring to the said some of the flaps, means for admitting air to the said flange, and means for discharging air from the flange to cool the hinge brackets, each flap comprising two spaced plates defining a passage therebetween for additional cooling air, the outlet of the passage being at the free end of the flap so that air flow is induced by the gas stream flowing through the nozzle.

6. A variable area nozzle comprising, in combination, a gas duct, a number of hinge brackets mounted on the duct at the outlet thereof in a circumferential array, a number of flaps pivoted on the hinge brackets for rotation about axes generally tangent to the duct, the said flaps and brackets being formed with closely fitting surfaces to minimize gas leakage therebetween, the flaps overlapping and being interlocked for concurrent movement about the respective axes, each flap comprising two plates fixed together and spaced to define air passages extending from adjacent the hinge brackets to adjacent the free end of the flap, and means for rotating the flaps about their respective mounting axes to vary the area of the nozzle.

7. A variable area nozzle comprising, in combination, a gas duct, a number of hinge brackets mounted on the duct at the outlet thereof in a circumferential array, a number of flaps pivoted on the hinge brackets for rotation about axes generally tangent to the duct, the said flaps and brackets being formed with closely fitting surfaces to minimize gas leakage therebetween, the flaps overlapping and being interlocked for concurrent movement about the respective axes, each flap comprising two plates fixed together and spaced to define air passages extending from adjacent the hinge brackets to adjacent the free end of the flap, means for circulating cooling air under pressure by the hinge brackets, and means for rotating the flaps about their respective mounting axes to vary the area of the nozzle.

8. A variable area nozzle comprising, in combination, a gas duct, a number of hinge brackets mounted on the duct at the outlet thereof in a circumferential array, a corresponding number of hinge blocks pivoted on the hinge brackets for rotation about axes generally tangent to the duct, the said blocks and brackets being formed with closely fitting surfaces to minimize gas leakage therebetween, a flap fixed on each hinge block, the flaps overlapping and being interlocked for concurrent movement about the respective axes, the marginal portion of one flap at each area of overlap with the adjacent flap being disposed approximately in the plane of the adjacent flap, each flap comprising two plates fixed together and spaced to define air passages extending from adjacent the hinge blocks to adjacent the free end of the flap, means for circulating cooling air under pressure by the hinge brackets, and means for rotating the flaps about their respective mounting axes to vary the area of the nozzle.

9. A variable area nozzle comprising, in combination, a gas duct, a number of flaps mounted on the duct at the outlet thereof in a circumferential array for rotation about axes generally tangent to the duct, the flaps overlapping and being coupled for concurrent movement about the respective axes, each flap comprising two plates fixed together and spaced to define cooling air passages extending from adjacent the respective axes to adjacent the free end of the flap, and means for rotating the flaps about their respective mounting axes to vary the area of the nozzle.

10. A variable area jet propulsion nozzle comprising, in combination, a tail pipe, a plurality of flaps mounted at the outlet of the tail pipe for rotation about axes approximately tangent to the outlet opening, a ring encircling the tail pipe, the flaps being coupled to the ring for actuation thereby, and means mounting the ring for guided reciprocation axially of the tail pipe comprising a plurality of brackets extending axially of the tail pipe from the ring and distributed circumferentially around the ring, a plurality of ways on the tail pipe extending axially thereof, and means on the brackets engaging the ways.

11. A variable area jet propulsion nozzle comprising, in combination, a tail pipe, a plurality of flaps mounted at the outlet of the tail pipe for rotation about axes approximately tangent to the outlet opening, a ring encircling the tail pipe, the flaps being coupled to the ring for actuation thereby, and means mounting the ring for guided reciprocation axially of the tail pipe comprising a plurality of brackets extending axially of the tail pipe from the ring and distributed circumferentially around the ring, a plurality of ways on the tail pipe extending axially thereof, means on the brackets engaging the ways, and means for adjusting the mounting means to center the ring relative to the tail pipe.

References Cited in the file of this patent

UNITED STATES PATENTS

| | | |
|---|---|---|
| 186,310 | Curtis | Jan. 16, 1877 |
| 543,182 | Hunt | July 23, 1895 |
| 1,760,624 | Badertscher | May 27, 1930 |
| 2,551,372 | Haltenberger | May 1, 1951 |
| 2,569,497 | Schiesel | Oct. 2, 1951 |
| 2,575,735 | Servanty | Nov. 20, 1951 |
| 2,585,270 | Plath | Feb. 12, 1952 |
| 2,603,062 | Weiler et al. | July 15, 1952 |
| 2,693,078 | Laucher | Nov. 2, 1954 |
| 2,715,312 | Brame | Aug. 16, 1955 |

FOREIGN PATENTS

| | | |
|---|---|---|
| 518,663 | Great Britain | Mar. 5, 1940 |
| 600,075 | Great Britain | Mar. 31, 1948 |